United States Patent [19]
Kreitz

[11] 4,144,781
[45] Mar. 20, 1979

[54] DUST COLLECTOR FOR RADIAL ARM SAWS

[76] Inventor: Lloyd D. Kreitz, Box 60, Peguot Lakes, Minn. 56472

[21] Appl. No.: 873,360

[22] Filed: Jan. 30, 1978

[51] Int. Cl.$^2$ .......................... B27B 5/20; B27G 3/00; B26D 7/18
[52] U.S. Cl. .................................... 83/100; 83/471.3
[58] Field of Search ............................. 83/100, 471.3

[56] References Cited
U.S. PATENT DOCUMENTS

| 2,839,102 | 6/1958 | Kido | 83/100 |
| 3,322,169 | 5/1967 | Hilliard | 83/100 |
| 3,401,724 | 9/1968 | Kreitz | 83/471.3 |
| 3,945,281 | 3/1976 | Kreitz | 83/100 |
| 3,958,474 | 5/1976 | Kreitz | 83/100 |

Primary Examiner—J. M. Meister

[57] ABSTRACT

Improved dust collector for radial arm saws of the type in which a generally funnel-shaped flat-bottomed shroud is connected to a vacuum hose and positioned at the rear of the worktable. The top and bottom of the shroud are contoured so that the shroud partially surrounds the column which supports the radial arm, the bottom of the shroud resting on a platform clipped to the spacer board of the saw table and attached to the saw frame. The shroud is clipped to the platform in a manner permitting it to be aligned with the saw blade, even during bevel cuts along the left half of the saw table, and thus is especially effective in collecting sawdust and wood chips.

11 Claims, 4 Drawing Figures

DUST COLLECTOR FOR RADIAL ARM SAWS

BACKGROUND OF THE INVENTION

This invention relates to dust collectors for radial arm saws.

Over the past several years, radial arm saws have increased in popularity, largely because of their great versatility. This popularity has been enhanced by the development of dust collecting systems for such pieces of equipment, greatly reducing the dangerous accumulation of wood chips and air-suspended dust in the shop or home.

The first dust collector designed for radial arm saws was, to the best of my knowledge, the one shown in my U.S. Pat. No. 3,401,724. The dust collector comprised a funnel-shaped flat-bottomed shroud positioned at the rear of the saw worktable and arranged to be arcuately movable thereover in alignment with the saw blade. The shroud was mounted on a sheet metal support having a lip which clamped between the rip fence and rear table of the saw and cantilevered beyond the rearmost portion of the saw table. The support, or platform, was somewhat inconvenient to install and use because it limited the angles at which the saw could be operated and made it difficult to adjust the table clamping device, which was typically located beneath it.

Subsequent developments in the field of dust collectors for radial arm saws are illustrated in my U.S. Pat. Nos. 3,945,281 and 3,958,474. The first of these two patents shows a simple hold-down clip extending over the spacer board, the floor of the shroud being slid between the clip and the spacer board to hold it in place. The later patent employs a hood having a rearwardly extending slot in the floor, a bolt and wing nut extending through the slot and the spacer board. In each of these assemblies the equipment was simple, and the angle of the hood was readily adjusted. At some angles, however, it was necessary to use care to make certain that the saw blade did not contact the shroud; particular problems were encountered in making bevel cuts over the left half of the saw table, where it was difficult to align the shroud with the saw blade.

SUMMARY

The present invention provides radial arm saws with a dust collector having the desirable features of my previously discussed collectors; additionally, the present invention offers advantages not possessed by such collectors. The collector is readily installed, even without using tools, and it can be adjusted to any angle at which the saw operates. Thus, even bevel cuts over the left half of the saw table are performed with the shroud aligned with the saw blade. The shroud itself is readily maintained out of contact with the saw blade.

Like the dust collector of my aforementioned U.S. Pat. No. 3,401,724, the present invention utilizes a platform which is positioned so that a portion of it rests on top of the spacer board and extends rearwardly therefrom, the shroud being positioned on top of the platform. In the present invention, the platform is large enough to surround the column on both sides and the rear, being connected to the saw base by at least one supporting means. In order to surround the column, the platform is shaped with a generally U-shaped opening in the front edge. The forward edges of both the floor and the top of the shroud are likewise contoured to have U-shaped openings, thus permitting the shroud to extend on both sides of the saw column and enhance the effectiveness of the dust collector in capturing saw dust and wood chips. The shroud is adjustably clamped to the platform by a pair of clips which fit over the edges of the platform opening and the floor of the shroud. Preferably the clips are permanently attached to the platform. When it is desired to align the shroud with the saw blade in making bevel cuts, the shroud is pivoted and slid in the appropriate direction, in which case the clips grip a different portion of the floor.

BRIEF DESCRIPTION OF THE DRAWING

As a further aid to understanding the invention, attention is directed to the accompanying drawings, in which like numbers refer to like parts in the several views, and in which.

DESCRIPTION OF PRESENTLY PREFERRED EMBODIMENT

Figure 1:
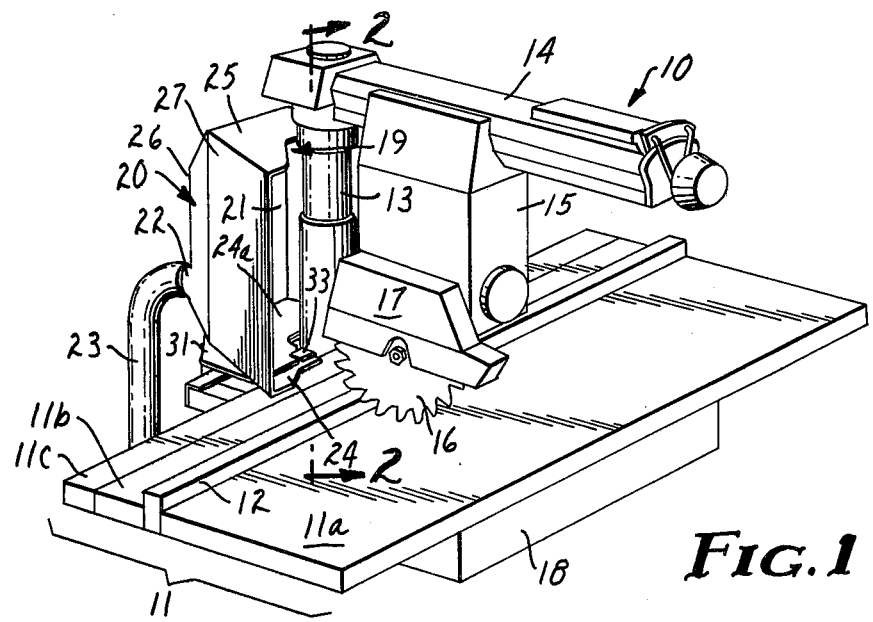
FIG. 1 is a perspective view of a radial arm saw, the arm being aligned for a 90° cut, showing the presently preferred embodiment of my improved dust collector in position.
Figure 2:
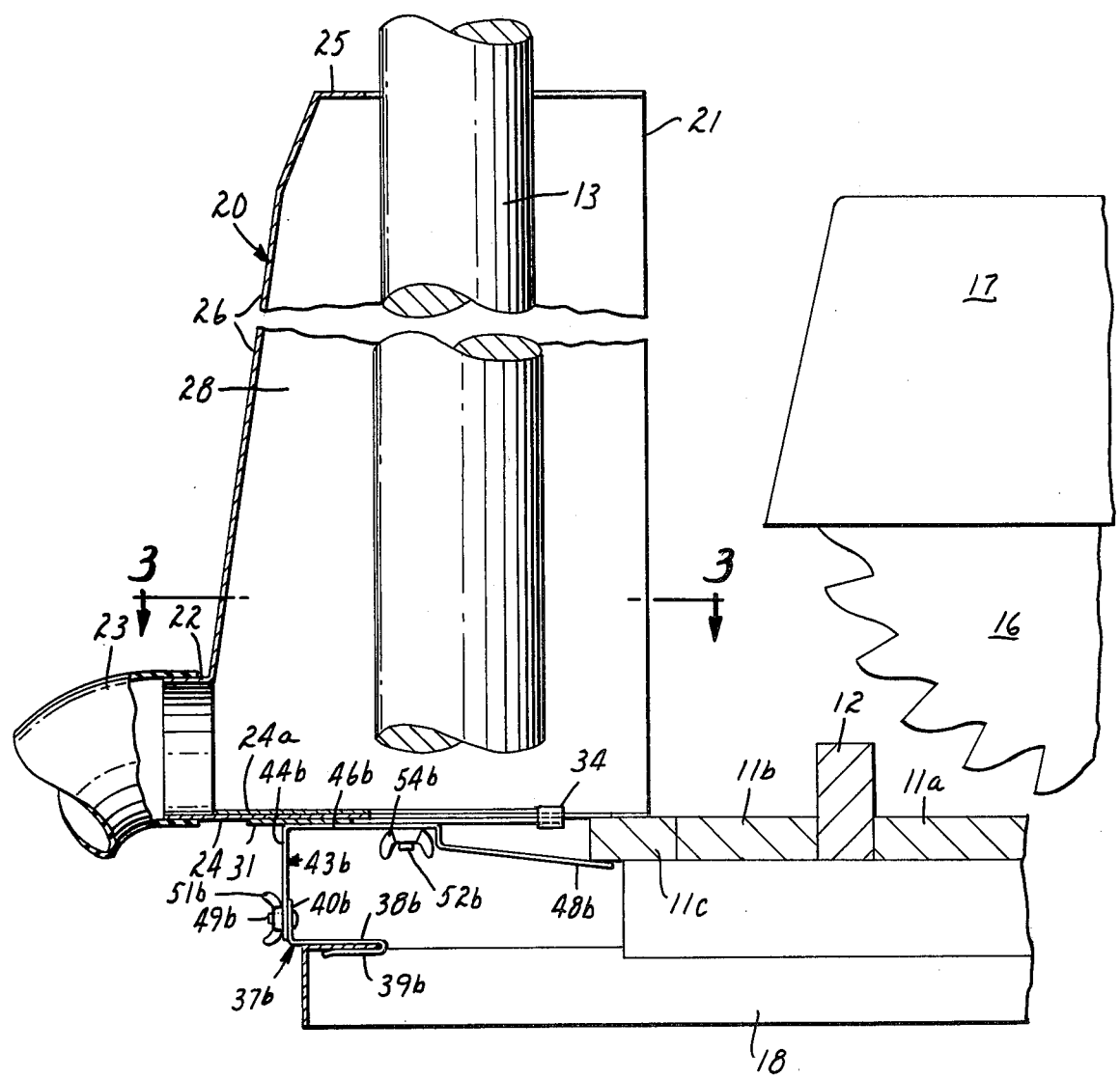
FIG. 2 is a cross-sectional view of a portion of the equipment depicted in FIG. 1, taken along section line 2 — 2 and looking in the direction of the arrows.

In the drawings, radial arm saw assembly 10 comprises worktable 11, made up of front table 11a and back table 11b, between which is positioned rip fence 12. Spacer board 11c is located at the back of rear table 11b, and clamps (not shown) draw the subparts of worktable 11 and rip fence 12 snugly together. Worktable 11 is supported by saw base 18, which also supports extensible column 13, located at the rear of worktable 11. Extending horizontally from the top of column 13 is radial arm 14, which is capable of rotating through 360°, but which is generally positioned over the top of worktable 11. Mounted on arm 14, so as to move therealong, is saw carriage 15, including rotary saw blade 16 and guard 17. The entire assembly 10, as just described, comprises conventional equipment and forms no part of my invention per se.

Positioned over spacer board 11c and extending rearwardly therefrom is generally funnel-shaped shroud 20, having a wide inlet opening 21 and a narrow outlet opening 22. Hose 23 of a conventional home shop vacuum cleaner (not shown) is connected to outlet 22 to remove sawdust and wood chips directed into shroud 20 during normal sawing operations.

Figure 3:
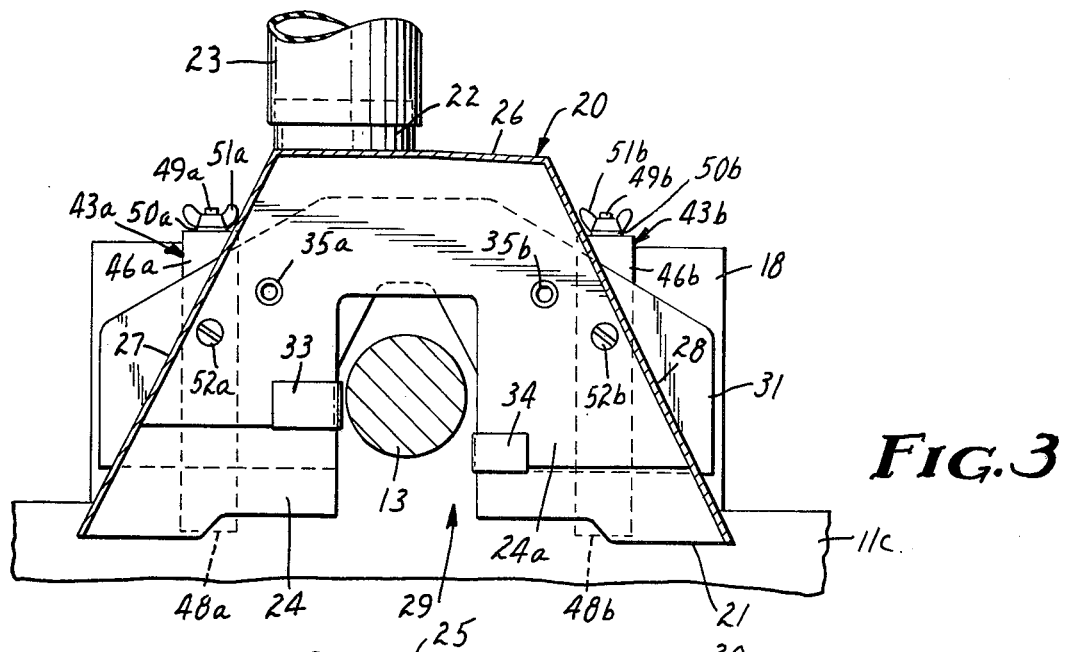
FIG. 3 is a cross-sectional view of the dust collector of FIG. 2, taken along section lines 3 — 3 and looking in the direction of the arrows.
Figure 4:
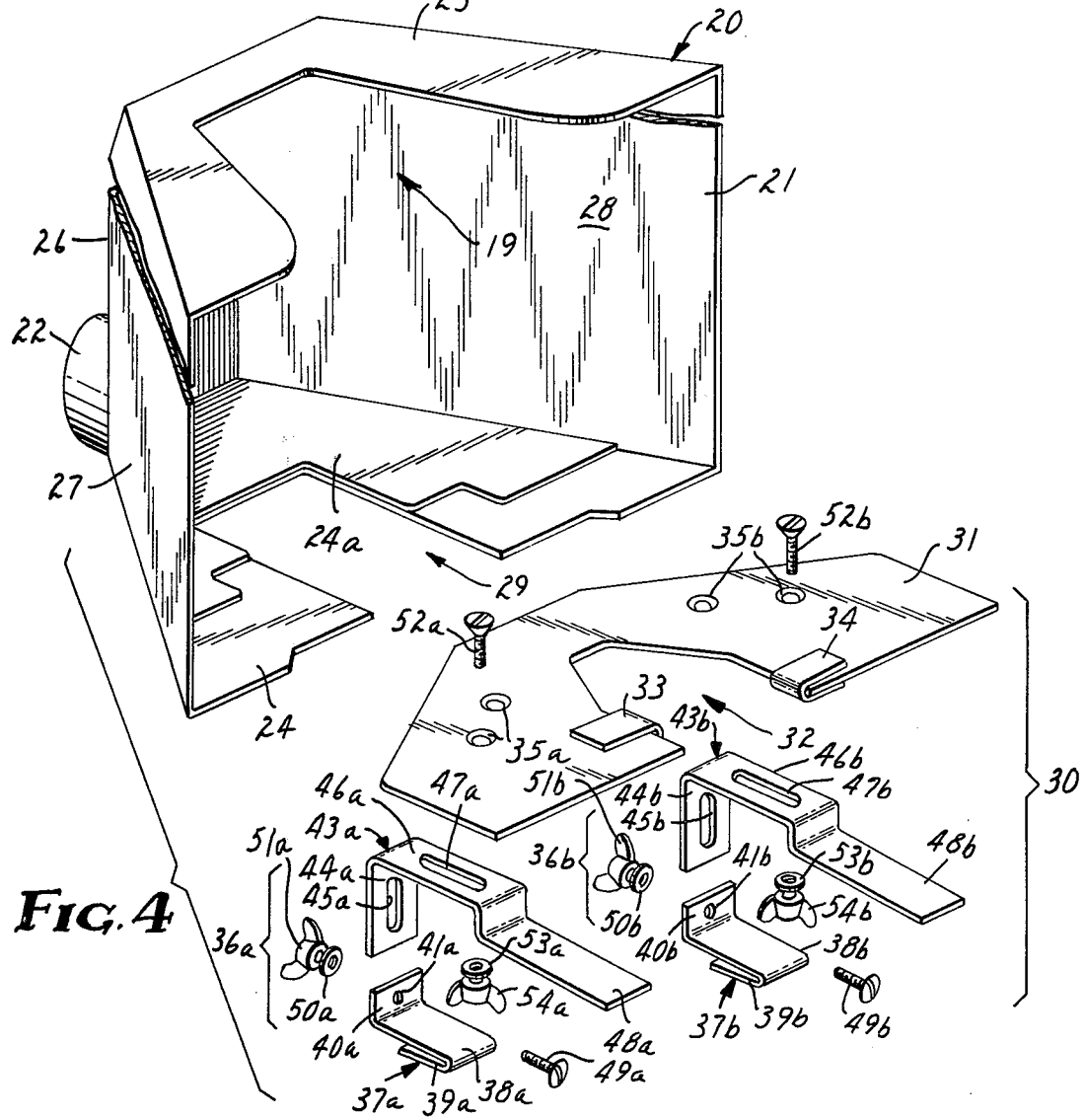
FIG. 4 is an exploded view of the component parts making up the dust collector shown in FIGS. 1–3.

Shroud 20, as is shown particularly in FIG. 3, has a generally regular trapezoidal shape in cross-section, comprising left wall 27, right wall 28 and rear wall 26. Completing the shroud are top 25, having a generally U-shaped cutaway portion 19 at its forward edge, and floor 24, having a similar generally U-shaped cutaway portion 29 at its forward edge. Floor 24 is provided with a built-up portion 24a at the back, the function of which will be discussed subsequently.

In normal use, shroud 20 rests on shroud support assembly 30, the latter comprising platform 31, which has a generally U-shaped cutaway portion 32 at its forward edge. Located along the left and right edges respectively of cutaway portion 32 are clips 33 and 34;

preferably the lower half of these clips is welded to the under surface of platform 31. Shroud 20 is held in place on platform 31 by sliding the forward edges of floor 24 beneath clips 33 and 34 until clips 33 and 34 encounter built-up portion 24a of floor 24 for normal sawing operations. Where bevel cuts are to be made, so that radial arm 14 is swung to either the left or right, shroud 20 is rotated to achieve appropriate alignment with saw blade 16. In either case, a sufficient portion of floor 24 remains to provide for adequate gripping by clips 33 and 34.

As previously pointed out, the forward edge of platform 31 rests on top of spacer board 11c. To provide support for the rear of platform 31, a pair of bracket assemblies 36a, 36b are employed. Each such assembly is made clip members 37a, 37b connected to vertically adjustable members 43a, 43b. Clip members 37a, 37b have horizontal portions 38a, 38b, distal ends 39a, 39b being doubled over to provide a clip. Members 37a, 37b also have vertical portions 40a, 40b, respectively provided with holes 41a, 41b.

Adjustable members 43a, 43b comprise vertical portions 44a, 44b, respectively provided with vertically extending slots 45a, 45b, and horizontal portions 46a, 46b, likewise respectively provided with longitudinally extending slots 47a, 47b. Distal ends 48a, 48b of horizontal portions 46a, 46b are deflected downward for a purpose to be described shortly.

To install platform 31 on radial arm saw assembly 10, members 37a, 37b are clipped onto the upper angle iron portion of saw base 18, vertical portions 40a, 40b extending upward. Adjustable members 43a, 43b are then positioned so that holes 41a, 41b are respectively aligned with slots 45a, 45b, after which screws 49a, 49b, washers 50a, 50b and wing nuts 51a, 41b are employed to hold members 43a, 43b at the proper height. Distal portions 48a, 48b of members 43a, 43b extend forward and are positioned snugly against the bottom of spacer board 11c. Platform 31 is then placed on top of horizontal portions 46a, 46b so that the appropriate pair of holes 35a, 35b align with slots 47a, 47b, screws 52a, 52b, washers 53a, 53b and wing nuts 54a, 54b being used to to connect platform 31 snugly to horizontal portions 46a, 46b of members 43a, 43b.

When mounted as just described, platform 31 is stabilized against tipping backward because of the fact that spacer board 11c is gripped between the lower surface of the leading edge of platform 31 and the upper surface of distal portions 48a, 48b of members 43a, 43b.

As previously pointed out, the foregoing description covers only the presently preferred embodiment of the invention, and it is anticipated that various modifications may be made for specific purposes without departing from the spirit of the invention.

What I claim is as follows:

1. In combination with a radial arm saw assembly comprising a saw base, a vertical column positioned within the perimeter of said base at the rear thereof, a horizontal worktable positioned on said base in front of said column, said worktable including a front table and a rear table separated by a rip fence, a spacer board located at the back of the rear table, a horizontal arm rotatably attached to the upper end of said column so as to be positioned over said worktable, a rotary saw carried by said arm, a dust collector positioned at the rear of said worktable, said collector comprising a generally flat-bottomed funnel-shaped shroud having a wide inlet which opens toward the front of said worktable and a narrow outlet for connection to a vacuum hose, said inlet being positioned entirely above the plane of said worktable, a platform positioned so that a portion thereof rests on the spacer board and extends rearwardly therefrom, said shroud being positioned on top of said platform, the improvement which comprises said platform constructed with a generally U-shaped opening at its forward edge to permit it to surround the column on both sides and the rear, the bottom and top of said shroud both being constructed with generally U-shaped openings in their respective forward edges to permit said shroud to surround said column at both sides and the rear, a pair of clips firmly but adjustably connecting the floor of the shroud to the platform, and platform-supporting means connecting the platform to the saw base, whereby the shroud extends beyond the forward edge of the column and can be rotated over a wide arc to align with the saw blade, even when the horizontal arm is positioned over the left half of the table, thereby enhancing the effectiveness of the dust collector in capturing sawdust and wood chips.

2. The combination of claim 1 wherein a stabilizer means is connected to the bottom of the platform so as to extend forward beneath the spacer board, thereby gripping the spacer board between the lower surface of the platform and the upper surface of the stabilizer and minimizing any tendency for the platform to tip upward at its forward edge.

3. The combination of claim 1 wherein the platform-supporting means includes a spring clip for attachment to the frame of the saw base.

4. The combination of claim 3 wherein the platform-supporting means is formed from connected members comprising a frame-gripping lower member and an adjustable upper member, each of said members having a vertical portion and a horizontal portion, the vertical segments being connected, the horizontal portion of the upper member being in contact with the lower surface of the platform.

5. The combination of claim 4 wherein the horizontal portion of the upper member is connected to the platform.

6. The combination of claim 5 wherein the distal end of the horizontal portion of the upper member extends beneath the spacer board to exert a stabilizing influence on the platform.

7. The combination of claim 6 wherein the two vertical portions of the upper and lower members of the platform-supporting means are bolted together, one of said portions being provided with a vertically extending slot to permit adjustment of the platform height to compensate for various saw table and base dimensions.

8. The combination of claim 7 wherein the platform-supporting means comprises a pair of substantially identical support units.

9. The combination of claim 1 wherein the pair of clips are located at the lateral edges of the U-shaped openings in the platform and floor of the shroud.

10. The combination of claim 9 wherein the clips are welded to the platform.

11. The combination of claim 10 wherein the floor of the shroud is provided with a built-up portion at the rear to prevent the shroud from being positioned too far forward.

* * * * *